US012157081B2

(12) United States Patent
Valentini

(10) Patent No.: US 12,157,081 B2
(45) Date of Patent: Dec. 3, 2024

(54) FILTER ARRANGEMENT FOR FILTERING DUST-LADEN AIR GENERATED BY A HAND-GUIDED POWER TOOL AND POWER TOOL ARRANGEMENT COMPRISING A HAND-GUIDED POWER TOOL AND SUCH A FILTER ARRANGEMENT

(71) Applicant: Guido Valentini, Milan (IT)

(72) Inventor: Guido Valentini, Milan (IT)

( * ) Notice: Subject to any disclaimer, the term of this patent is extended or adjusted under 35 U.S.C. 154(b) by 0 days.

(21) Appl. No.: 18/142,761

(22) Filed: May 3, 2023

(65) Prior Publication Data

US 2023/0330583 A1    Oct. 19, 2023

Related U.S. Application Data

(62) Division of application No. 17/092,499, filed on Nov. 9, 2020, now Pat. No. 11,697,086.

(30) Foreign Application Priority Data

Nov. 26, 2019    (EP) ...................................... 19211438

(51) Int. Cl.
*B01D 46/00*    (2022.01)
*B01D 46/24*    (2006.01)
(Continued)

(52) U.S. Cl.
CPC ...... *B01D 46/2411* (2013.01); *B01D 46/0004* (2013.01); *B01D 46/0043* (2013.01);
(Continued)

(58) Field of Classification Search
CPC ............ B01D 46/2411; B01D 46/0004; B01D 46/0043; B01D 46/0049; B01D 46/4227;
(Continued)

(56) References Cited

U.S. PATENT DOCUMENTS 5,090,499 A    2/1992    Cuneo
2004/0060145 A1*    4/2004    Hayama ................ A47L 7/0085
15/353
(Continued)

FOREIGN PATENT DOCUMENTS

EP    1 477 273 A1    11/2004
EP    1 849 555 A1    10/2007
(Continued)

OTHER PUBLICATIONS

English Abstract of JP 2005305577A.
English Abstract of WO 2010/029687, see its Abstract on p. 1.

*Primary Examiner* — Robert A Hopkins
(74) *Attorney, Agent, or Firm* — Ware, Fressola, Maguire & Barber LLP

(57) ABSTRACT

A filter arrangement for filtering dust-laden air generated by a hand-guided power tool having a motor features a filter cartridge having a hollow casing with a longitudinal extension along a longitudinal axis, a hollow filter element located inside the hollow casing, having a longitudinal extension along the longitudinal axis, an air inlet port in the hollow casing, pneumatically connected to the power tool to allow the dust-laden air generated by the power tool to flow into the hollow casing, and an air outlet port in the hollow casing, to allow filtered air to leave the filter cartridge. An external chamber of the filter cartridge is formed between the hollow casing and the hollow filter element. An internal chamber is formed inside the hollow filter element. The internal chamber is closed by a conical head portion at a first end of the internal chamber facing towards the air inlet port. The external chamber is in pneumatic connection with the air inlet port and the internal chamber at a second end opposite to the first end is in pneumatic connection with the air outlet port. The filter arrangement includes an active airflow generating device being in pneumatic connection with the air (Continued)

outlet port and the internal chamber of the filter cartridge in order to generate or support the airflow through the filter cartridge.

21 Claims, 8 Drawing Sheets

(51) Int. Cl.
  *B01D 46/42* (2006.01)
  *B01D 46/46* (2006.01)
  *B24B 55/10* (2006.01)
(52) U.S. Cl.
  CPC ..... *B01D 46/0049* (2013.01); *B01D 46/4227* (2013.01); *B01D 46/4245* (2013.01); *B01D 46/46* (2013.01); *B24B 55/102* (2013.01); *B01D 2273/30* (2013.01)
(58) Field of Classification Search
  CPC .... B01D 46/4245; B01D 46/46; B01D 46/24; B01D 46/00; B01D 46/42; B24B 55/102; B24B 55/10

USPC .......................................................... 96/399
  See application file for complete search history.

(56) References Cited

U.S. PATENT DOCUMENTS

| | | | |
|---|---|---|---|
| 2004/0226272 A1 | 11/2004 | Valentini | |
| 2005/0013711 A1* | 1/2005 | Goyetche | B01D 46/62 |
| | | | 417/313 |
| 2005/0111214 A1* | 5/2005 | Zeiler | B25B 23/18 |
| | | | 362/119 |
| 2007/0251199 A1* | 11/2007 | Valentini | B23Q 11/0046 |
| | | | 55/418 |
| 2008/0181794 A1 | 7/2008 | Steinfels | |
| 2015/0093973 A1* | 4/2015 | Sergyeyenko | A47L 5/365 |
| | | | 15/344 |
| 2019/0380548 A1* | 12/2019 | Moeller | A47L 5/225 |

FOREIGN PATENT DOCUMENTS

| | | |
|---|---|---|
| JP | 2005 305577 A | 11/2005 |
| WO | 2010/029687 A1 | 3/2010 |

\* cited by examiner

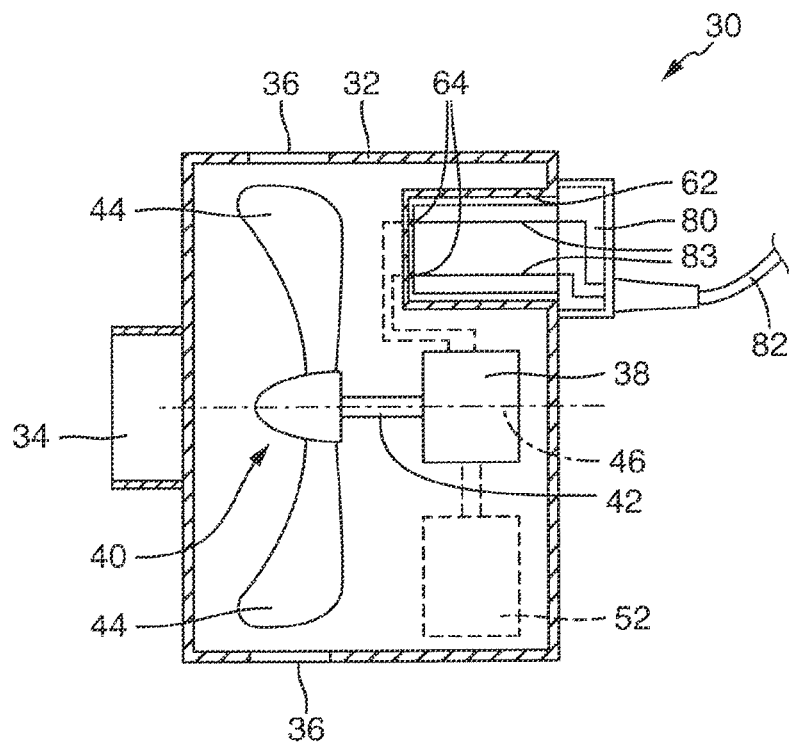
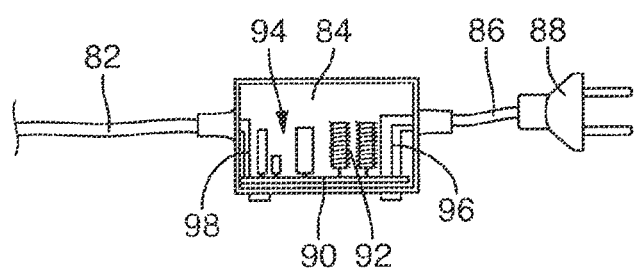
Fig. 8

FILTER ARRANGEMENT FOR FILTERING DUST-LADEN AIR GENERATED BY A HAND-GUIDED POWER TOOL AND POWER TOOL ARRANGEMENT COMPRISING A HAND-GUIDED POWER TOOL AND SUCH A FILTER ARRANGEMENT

CROSS-REFERENCE TO RELATED APPLICATIONS

This application is a divisional application of, and claims benefit to, application Ser. No. 17/092,499, filed 9 Nov. 2020, which is hereby incorporated by reference in its entirety.

BACKGROUND OF THE INVENTION

1. Field of Invention

The present invention relates to a filter arrangement for filtering dust-laden air generated by a hand-guided power tool having an electric motor, in particular a sander or a grinder, during operation of the power tool. The filter arrangement comprises a filter cartridge having
  a hollow casing,
  at least one filter element located inside the casing,
  an air inlet port provided in the casing, the air inlet port located upstream in respect to an airflow through the filter cartridge and in respect to the filter element, the air inlet port adapted to be pneumatically connected to the power tool in order to allow the dust-laden air generated by the power tool to flow into the casing, and
  an air outlet port provided in the casing, the air outlet port located downstream in respect to the airflow through the filter cartridge and in respect to the filter element, the air outlet port adapted to allow filtered air leave the filter cartridge.

Further, the invention also relates to a power tool arrangement comprising a hand-guided power tool, in particular a sander or a grinder, and a filter arrangement for filtering dust-laden air generated by the power tool during its operation of the above-mentioned kind. The power tool could be any electrically or pneumatically driven power tool which generates dust during its intended use. Besides the mentioned sanders and grinders, further examples for such power tools are power saws, power drills, hammer drills, power chisels or the like.

2. Description of Related Art

Filter arrangements of the above-mentioned kind are known in the prior art. For example, RUPES S.p.A. commercializes a filter cartridge under the name GREENTECH, which may be directly pneumatically connected to an air outlet socket of a hand-guided power tool, in particular a sander. The known filter cartridge is described in detail in EP 1 849 555 A1, which is incorporated herein by reference in its entirety. The power tool comprises a fan which is adapted to blow dust-laden air generated during operation of the power tool through the air outlet socket of the power tool. The filter cartridge is directly pneumatically connected to the air outlet socket by means of its air inlet port. The filter cartridge constitutes a passive filter arrangement. The air flow of dust-laden air is generated by the power tool's fan, drawn through the filter cartridge, thereby filtered and the filtered air is drawn out of the filter cartridge into the environment though its air outlet port. The known filter cartridges have small dimensions, are light in weight and have a high degree of flexibility. On the other hand, the air filtering capabilities and efficiency of the known passive filter cartridges are worthy of improvement.

Furthermore, mobile or stationary vacuum cleaners are known in the art. These can be indirectly pneumatically connected to an air outlet socket of a power tool by means of a suction hose. The vacuum cleaners actively draw dust-laden air generated by the power tool during its operation into the vacuum cleaner, where the air is filtered and subsequently discarded into the environment through one or more outlet ports of the vacuum cleaner. Vacuum cleaners have good air filtering capabilities and efficiency. On the other hand, they have rather large dimensions, are rather heavy in weight and have only a limited flexibility. Due to the size even of mobile vacuum cleaners they cannot be moved, in particular carried, around easily by a user, in particular they cannot be attached to a belt of a user looped around the waist of the user or draped over a shoulder of the user. Freedom of movement of the user is significantly restricted during use of the power tool with the known vacuum cleaners.

SUMMARY OF THE INVENTION

Therefore, it is an object of the present invention to enhance the air filtering capabilities and efficiency of known filter arrangements and at the same time to maintain the small dimensions and flexibility of filter cartridges as far as possible.

In order to solve this object, the present invention provides a new filter arrangement. In particular, starting from the known filter arrangement of the above-mentioned kind, the new filter arrangement may include an active airflow generating device with a fan comprising a plurality of blades and driven by an electric fan motor separate from the electric motor of the hand-guided power tool, the airflow generating device being in pneumatic connection with the air inlet port of the filter cartridge or with the air outlet port of the filter cartridge in order to generate or support the airflow through the filter cartridge.

According to the present invention the known passive filter cartridge has been modified in order to turn it into an active filter cartridge which actively draws the airflow through the filter cartridge. The invention combines the advantages of conventional filter cartridges with the advantages of conventional vacuum cleaners. The filter arrangement has very good air filtering capabilities and efficiency of conventional vacuum cleaners and at the same time maintains the small dimensions and flexibility of conventional filter cartridges. The filter arrangement works perfectly well with power tools with or without a fan which is adapted to blow dust-laden air generated during operation of the power tool through the air outlet socket of the power tool. It is possible to attach at least part of the filter arrangement to a user's belt looped around the waist of the user or draped over a shoulder of the user. Alternatively, it is possible to rigidly attach at least part of the filter arrangement directly to the power tool so during use of the power tool the directly attached part of the filter arrangement is moved by the user together with the power tool. Freedom of movement of the user is maintained at a very high level during use of the power tool with the filter arrangement.

According to a first preferred embodiment of the invention, the airflow generating device is in pneumatic connection with the air inlet port of the filter cartridge in order to blow the dust-laden air generated by the power tool through the air inlet port into the casing of the filter cartridge and to create a high pressure inside the casing of the filter cartridge and to blow the filtered air through the air outlet port of the filter cartridge, thereby generating or supporting the airflow through the filter cartridge. Hence, the airflow generating device generates a low pressure downstream of the air outlet socket of the power tool thereby conveying the dust-laden air into the filter cartridge. Further, within the filter cartridge the airflow generating device creates a high pressure by blowing the dust-laden air into the filter cartridge and through at least one filter element located inside the casing of the filter cartridge. On the other side of the filter element the filtered air is blown through the air outlet port of the filter cartridge into the environment. This generates or supports the airflow through the filter cartridge. Additionally, the rotating fan generates a rotating airflow through the filter cartridge resulting in a cyclone or vortex effect hurling larger particles contained in the dust-laden air radially outwards within the filter cartridge. The particles hurled radially outwards are collected in the filter cartridge and will not reach the at least one filter element of the filter cartridge. In this manner, the filter element will have a longer lifetime before clogging with particles. Replacement or cleaning of the filter element can be performed in much longer intervals. No additional blades or the like are necessary within the filter cartridge in order to generate the cyclone or vortex effect. The fan blades are preferably made of a very robust and hard material, e.g. of steal, possibly enameled, ceramics, a synthetic or any compound material.

According to another preferred embodiment of the invention, it is suggested that the airflow generating device is in pneumatic connection with the air outlet port of the filter cartridge in order to suck the filtered air through the air outlet port of the filter cartridge and to create a low pressure inside the casing of the filter cartridge thereby sucking the dust-laden air generated by the power tool through the air inlet port into the casing of the filter cartridge and generating the airflow through the filter cartridge. The airflow generating device can be designed and connected to the air outlet port of the filter cartridge such that an air stream created by the fan and flowing through the airflow generating device essentially corresponds to the airflow through the filter cartridge. Alternatively, the airflow generating device can be designed and connected to the air outlet port of the filter cartridge such that a primary air stream is created by the fan, the primary air stream flowing essentially perpendicular to the airflow through the filter cartridge in order to generate or support the airflow in the manner of a jet pump. In this embodiment, the air stream generated by the fan is not the airflow through the filter cartridge.

According to a preferred embodiment of the invention it is suggested that the air inlet port of the filter cartridge is directly pneumatically connected to the power tool in order to allow the dust-laden air generated by the power tool to flow directly into the casing of the filter cartridge. Preferably, the filter cartridge is directly connected to an air outlet socket of the hand-guided power tool. The connection is releasable in order to allow detachment of the filter cartridge from the power tool when desired. The connection can be realized by means of frictional force and/or a bayonet joint between the air outlet socket of the power tool and the air inlet port of the filter cartridge. Any other type of releasable connection between the filter cartridge and the power tool may also be realized. This embodiment has the advantage that the power tool and the filter cartridge are rigidly connected to each other and constitute a single unit which can be easily handled.

Alternatively, it is suggested that the air inlet port of the filter cartridge is indirectly pneumatically connected to the power tool by means of a first suction hose in order to make the dust-laden air generated by the power tool to flow through the first suction hose into the casing of the filter cartridge. The suction hose is preferably connected to an air outlet socket of the hand-guided power tool with one end and with its other end to the air inlet port of the filter cartridge. The suction hose is preferably flexible and follows any movement of the power tool during its operation. The filter cartridge can be located at any place remote from the power tool. For example, the filter cartridge could be attached to a belt of a user looped around the waist of the user or draped over a shoulder of the user. The connections of the hose are releasable in order to allow detachment of the hose from the power tool and the filter cartridge when desired. The connections can be realized by means of frictional force and/or a bayonet joint between one end of the suction hose and the air outlet socket of the power tool and between the other end of the hose and the air inlet port of the filter cartridge. Any other type of releasable connections between the ends of the suction hose and the filter cartridge and the power tool, respectively, may also be realized. This embodiment has the advantage that the hand-guided power tool can be handled and operated to a great extent independently of the filter cartridge. In particular, the weight of the filter cartridge does not have to be moved together with the power tool during its operation.

According to another preferred embodiment of the invention it is suggested that the airflow generating device is directly pneumatically connected to the air outlet port of the filter cartridge in order to allow the filtered air from the filter cartridge to flow directly into the airflow generating device. The airflow generating device could be releasably connected to the air outlet port of the casing of the filter cartridge. The releasable connection could be realized by means of frictional force and/or a bayonet joint. This has the advantage that the combination of filter cartridge and airflow generating device can be modularly assembled depending on the individual needs of the respective filter arrangement. For example, a filter cartridge with a certain type of filter element (e.g. a paper filter element, a fabric filter element, a HEPA filter element) or with a certain volume for collecting dust and debris could be selected and used in the filter arrangement. Further, an airflow generating device for generating a certain flow rate (volume per time) could be selected and used in the filter arrangement. Alternatively, the airflow generating device could also form an integral part of that part of the casing of the filter cartridge which comprises the air outlet port. This embodiment has the advantage that the filter cartridge and the airflow generating device constitute a single unit which can be easily handled. In particular, the single unit comprising the filter cartridge and the airflow generating device could be attached to a belt of a user looped around the waist of the user or draped over a shoulder of the user.

Alternatively, it is suggested that the airflow generating device is indirectly pneumatically connected to the air outlet port of the filter cartridge by means of a second suction hose in order to make the filtered air from the filter cartridge to flow through the second suction hose into the airflow generating device. The suction hose is preferably connected to the air outlet port of the filter cartridge with one end and with its other end to an air inlet of the airflow generating device. The suction hose is preferably flexible and follows any movement of the filter cartridge and the airflow generating device, respectively, during operation of the power tool and use of the filter arrangement. The airflow generating device can be located at any place remote from the filter cartridge and/or the power tool. For example, the airflow generating device could be attached to a belt of a user looped around the waist of the user or draped over a shoulder of the user. The connections of the hose are releasable in order to allow detachment of the hose from the filter cartridge and the airflow generating device when desired. The connections can be realized by means of frictional force and/or a bayonet joint between one end of the suction hose and the air outlet port of the filter cartridge and between the other end of the hose and the air inlet of the airflow generating device. Any other type of releasable connections between the ends of the suction hose and the filter cartridge and the airflow generating device, respectively, may also be realized. This embodiment has the advantage that the hand-guided power tool can be handled and operated to a great extent independently of the airflow generating device. In particular, the weight of the airflow generating device does not have to be moved together with the power tool during its operation.

According to another preferred embodiment of the invention it is suggested that the airflow generating device comprises a housing and in the housing an electric motor and a fan driven by the electric motor, the fan comprising a plurality of blades, and that the housing comprises an air inlet located upstream in respect to the fan and in respect to an air stream flowing through the airflow generating device during its operation and an air outlet located downstream in respect to the fan and in respect to the air stream flowing through the airflow generating device. The fan or its blades, respectively, may be optimized in order to provide for a particularly efficient (large flow rate per energy consumption and size and weight, respectively) airflow generating device. Preferably, the blades extend radially outwards from an internal rotor-hub.

According to yet another embodiment of the invention, the airflow generating device comprises a housing, and in the housing an electric motor and at least partly in the housing a battery pack for operating the electric motor independently from a mains power supply. This embodiment has the advantage that the active filter arrangement works self-sufficient and independent from any external power supply. No separate cables for energy supply of the airflow generating device have to be provided. This is particularly advantageous if also the power tool with which the filter arrangement works together with and to which it is attached is also operated by a battery independently from a mains power supply.

It is suggested that the housing of the airflow generating device comprises an externally accessible compartment for receiving at least part of the battery pack, and wherein the battery pack is extractable from the compartment. The battery pack is electrically contacted with the electronic components of the airflow generating device automatically upon full insertion into the compartment. To this end, the compartment as well as a housing of the battery pack is provided with electric contacts which enter into contact upon full insertion of the battery pack into the compartment. The battery pack may be releasably attached to the housing of the airflow generating device, for example by means of a spring or snap lock or magnetically. This embodiment has the advantage that the battery pack can be extracted from the housing, e.g. for charging a used-up battery pack and/or for replacing a used-up battery pack by another (fully) charged battery pack. This allows an almost infinite almost continuous use of the active filter arrangement.

According to a preferred embodiment the airflow generating device comprises a power supply unit with a cable and a power plug for attachment to a power socket of a mains power supply, the power supply unit being adapted to be at least partly inserted into the compartment instead of the battery pack for operating the electric motor with electric energy from the mains power supply. The power supply unit is electrically contacted with the electronic components of the airflow generating device automatically upon full insertion into the compartment. To this end, the compartment as well as a housing of the power supply unit is provided with electric contacts which enter into contact upon full insertion of the power supply unit into the compartment. The power supply unit may be releasably attached to the housing of the airflow generating device, for example by means of a spring or snap lock or magnetically. The power supply unit comprises all electric and electrical components necessary for transforming the voltage of the mains power supply (e.g. 230V or 110V) into an operating voltage of the airflow generating device (e.g. 12V, 18V, 24V, 36V, 48V) and possibly also the current of the mains power supply into an operating current of the airflow generating device. The electric and electronic components may comprise a transformer, a rectifier, a controller or regulator, and one or more capacitors, coils, inductances, resistors. This embodiment has the advantage that in case of a long use of the power tool and the filter arrangement or when sanding large workpiece surfaces, the filter arrangement can be operated with electric energy from the mains power supply.

Alternatively, the airflow generating device comprises an adapter unit with a first cable connected to an external power supply unit with a second cable and a power plug for attachment of the external power supply unit to a power socket of a mains power supply, the adapter unit being adapted to be at least partly inserted into the compartment instead of the battery pack for operating the electric motor with electric energy from the mains power supply. The adapter unit is electrically contacted with the electronic components of the airflow generating device automatically upon full insertion into the compartment. To this end, the compartment as well as a housing of the adapter unit is provided with electric contacts which enter into contact upon full insertion of the adapter unit into the compartment. The adapter unit may be releasably attached to the housing of the airflow generating device, for example by means of a spring or snap lock or magnetically. The adapter unit merely serves as an interface between the compartment and the power supply unit. The power supply unit comprises all electric and electrical components necessary for transforming the voltage of the mains power supply (e.g. from 100V to 240V, from 50 Hz to 60 Hz alternate voltage) into an operating voltage of the airflow generating device (e.g. 12V, 18V, 24V, 36V, 48V, preferably a direct voltage) and possibly also the current of the mains power supply into an operating current of the airflow generating device. The electric and electronic components may comprise a transformer, a rectifier, a controller or regulator, and one or more capacitors, coils, inductances, resistors. The adapter unit may at the most comprise passive electric components. This embodiment has the advantage that in case of a long use of the power tool and the filter arrangement or when sanding large workpiece surfaces, the filter arrangement can be operated with electric energy from the mains power supply. At the same time, the filter arrangement can be operated without having to carry around the (rather heavy and bulky) power supply unit. The power supply unit can be put down and set aside on the floor or any other desired place.

According to yet another preferred embodiment of the present invention, it is suggested that the casing of the filter cartridge comprises a lid detachable from the rest of the casing and comprising the air outlet port, wherein the airflow generating device forms an integral part of the lid. The lid may be detached from the rest of the casing in order to empty the casing from dust and debris filtered out of the dust-laden air and collected in the casing and/or to remove the filter element for cleaning or replacement by another filter element. Preferably, the lid comprises the housing, the electric motor and the fan of the airflow generating device as an integral part. Hence, the lid and the housing of the airflow generating device are a single element. This has the advantage that the filter cartridge and the airflow generating device can be easily handled as a single unit. In particular, the single unit comprising the filter cartridge and the airflow generating device could be attached to a belt of a user looped around the waist of the user or draped over a shoulder of the user.

The active filter arrangement may work with power tools with or without an integrated dust extraction system. The dust extraction system integrated in the power tool may comprise a fan adapted for blowing the dust-laden air generated by the power tool through an air outlet socket of the power tool, to which the air inlet port of the filter cartridge is directly or indirectly pneumatically connected. The fan is driven by a drive shaft of the power tool, which may also drive a backing pad of the tool, to which a sanding material is attached. The fan supports the effect of the airflow generating device. While the airflow generating device sucks the dust-laden air into the filter cartridge, the fan blows the dust-laden air into the filter cartridge. Of course, the filter arrangement according to the invention will work just as well in connection with power tools without an integrated dust extraction system.

The object of the invention is also solved by a power tool arrangement comprising a hand-guided power tool, in particular a sander or a grinder, and a filter arrangement according to the present invention for filtering dust-laden air generated by the power tool during its operation. Preferably, the power tool comprises a transmitter device for transmitting radio signals containing information relating to operation of the power tool, in particular to turning on and/or turning off the power tool. These radio signals may be received by a respective receiver device making part of the airflow generating device. A processing unit of the airflow generating device may process received signals, extract information contained therein, evaluate the extracted information and depending on the content of the information provide for automatic start/stop of the electric motor of the airflow generating device. Alternatively, the airflow generating device may be provided with a switch, preferably easy to actuate, e.g. with working gloves at the user's hands, by the palm of a user's hand or the user's elbow, in order to allow an easy manual start/stop of the electric motor of the airflow generating device.

Further features and advantages of the present invention will be described in more detail hereinafter with reference to various preferred embodiments shown in the accompanying drawings. The features of the various embodiments described and shown in the drawings may be combined in any desired manner, even if that specific combination is not explicitly described and/or shown in the drawings. The drawings show:

BRIEF DESCRIPTION OF THE DRAWING

The Drawing includes the following Figures:

FIG. 8 an airflow generating device of the filter arrangement of FIGS. 2 and 3 according to a third embodiment;

DETAILED DESCRIPTION OF THE BEST MODE OF THE INVENTION

Figure 1:
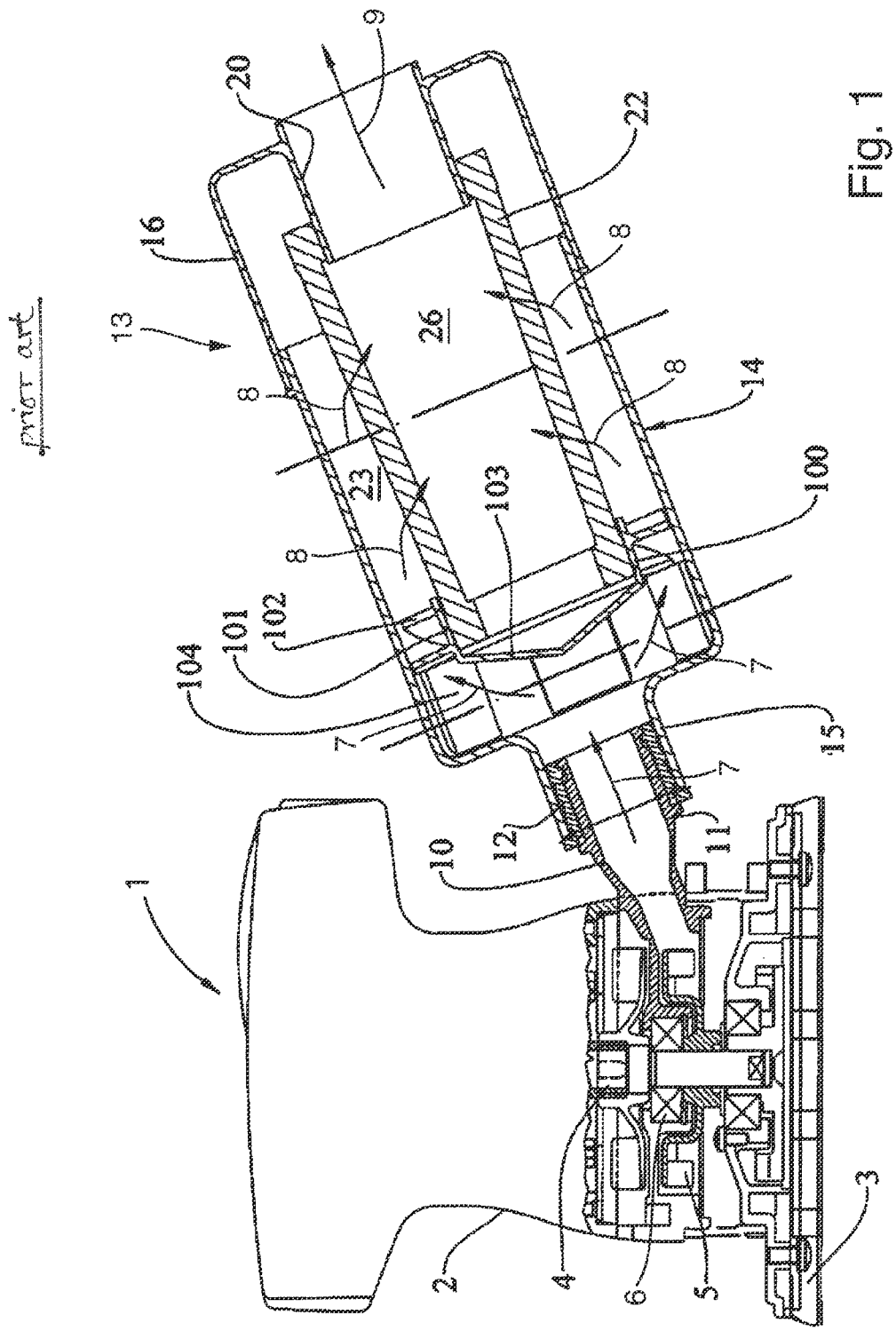
FIG. 1 a conventional filter arrangement known in the art.

FIG. 1 shows a conventional filter arrangement like it is known, for instance, from EP 1 849 555 A1. The filter arrangement serves for filtering dust-laden air generated by a hand-guided power tool 1 during its operation. The filter arrangement comprises a filter cartridge 13 pneumatically connected to the power tool 1. In the shown embodiment the power tool 1 is embodied as an orbital sander. Of course, the power tool 1 could also be embodied as a grinder, a power saw, a power drill, a hammer drill, a power chisel or the like. A sanding material is attached to a bottom surface of a backing pad 3 of the power tool 1. In a view from above the backing pad 3 may have a triangular (delta-shaped), round or rectangular form. In order to perform a working movement of the backing pad 3 during the intended use of the power tool 1, the backing pad 3 is driven by a drive shaft 4 which is rotatably supported in a body of the power tool 1 by means of bearings 6. The working movement of the backing pad 3 may be purely rotational, random orbital, gear driven or purely orbital. The drive shaft 4 is driven about its longitudinal axis by means of a pneumatic or electric motor (not shown) located inside a housing 2 of the power tool 1.

The power tool 1 comprises an internal dust suction device comprising a fan 5 driven by the drive shaft 4. The fan 5 rotates about the longitudinal axis of the drive shaft 4. The fan 5 has the task of aspiring dust-laden air 7 from the backing pad 3 (through holes and channels provided in the backing pad 3) and from a surface to be worked and to blow the dust-laden air 7 towards a connection tube 10. The connection tube leads to an air outlet socket 11 of the power tool 1. The filter cartridge 13 is directly attached to the air outlet socket 11 with its air inlet port 15. A seal 12 may be provided between the air outlet socket 11 of the power tool 1 and the air inlet port 15 of the filter cartridge 13. The filter cartridge 13 is held by way of friction on the air outlet socket 11.

The filter cartridge 13 comprises a hollow casing 14 preferably made of plastic material. The casing 14 has an essentially cylindrical form with a longitudinal extension. At least one filter element 22 is located inside the casing 14. The filter element 22 has also an essentially cylindrical form with a smaller diameter than the casing 14. The casing 14 and the filter element 22 preferably share the same longitudinal axis. The filter element 22 separates the internal chamber of the casing 14 into two separate partial chambers, a first external essentially hollow cylindrical input chamber 23 and a second internal essentially cylindrical output chamber 26. The only way for dust-laden air 7 contained in the first chamber 23 to reach the second chamber 26 is through the filter material of the filter element 22. The air inlet port 15 leads into a pre-chamber 104 in which a bladed element 100 is located. The bladed element 100 has a cylindrical portion 101 with peripheral blades 102 radially extending therefrom and a conical head portion 103, the tip of which pointing towards the air inlet port 15. The bladed element 100 or the conical head portion 103, respectively, separates the first input chamber 23 from the second output chamber 26. On its way through the filter cartridge 13 the dust-laden air 7 passes through the filter element 22 in order to filter out dust and debris and to create filtered air 9, which subsequently passes through an air outlet port 20 of the filter cartridge 13 and is discarded into the environment. In respect to the flow of dust-laden air 7, the cyclonic air flow 8 and the flow of filtered air 9, the air inlet port 15 is located upstream and the air outlet port 20 is located downstream of the filter element 22.

The bladed element 100 or the peripheral blades 102, respectively, induce a rotation of the dust-laden air 7 when passing the peripheral blades 102, thereby creating a vortex of a cyclonic air flow 8 of the dust-laden air 7 in the first external chamber 23. This provokes an extraction and separation of the larger dust and debris particles from the dust laden air 7. The extracted and separated particles are collected in the first chamber 23, in particular at the bottom of the casing 14. Hence, the larger particles have already been extracted or separated from the dust-laden air 7 before the cyclonic air flow 8 passes through the filter element 22 from the first input chamber 23 into the second output chamber 26. Consequently, the filter element 22 has to filter out only smaller particles form the dust-laden air 7 and the cyclonic air flow 8, respectively, and, therefore, has a much longer lifetime before clogging.

The rear part of the casing 14 comprises a lid 16 which is detachable from the rest of the casing 14. The lid 16 is releasably attached to the rest of the casing 14 by means of frictional force. The lid 16 comprises the air outlet port 20. The filter element 22 and the bladed element 100 are attached to the lid 16. The lid 16 may be opened in order to discard the particles of dust and debris collected in the first external chamber 23 and the bottom of the casing 14 and/or in order to clean/replace the filter element 22.

Figure 2:
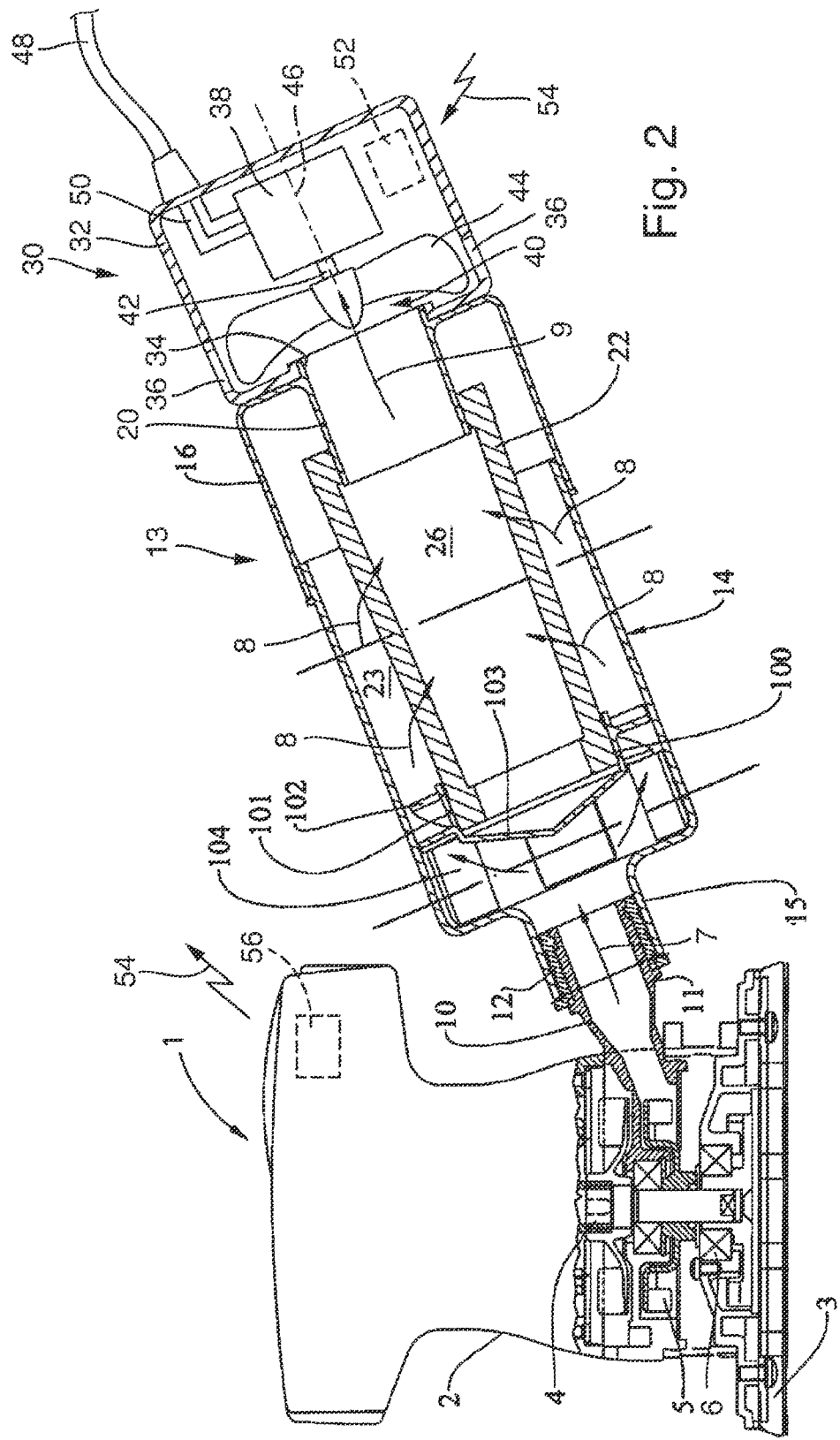
FIG. 2 a filter arrangement according to a preferred embodiment of the invention.

The filter arrangement according to the present invention, a preferred embodiment of which is shown in FIG. 2, comprises an airflow generating device 30, which is in pneumatic connection with the air outlet port 20 of the filter cartridge 13 in order to suck the filtered air 9 through the air outlet port 20 of the filter cartridge 13 and to create a low pressure inside the casing 14, in particular in the second internal chamber 26, of the filter cartridge 13, thereby sucking the dust-laden air 7 generated by the power tool 1 through the air inlet port 15 into the casing 14, in particular into the first external chamber 23, of the filter cartridge 13 and generating or at least supporting the airflow 7, 8, 9 through the filter cartridge 13. In this embodiment the airflow generating device 30 is designed and connected with its air inlet 34 to the air outlet port 20 of the filter cartridge 13 such that an air stream created by the fan 40 and flowing through the airflow generating device 30 essentially corresponds to the airflow 8, 9 through the filter cartridge 13. The low pressure is a pressure below atmospheric pressure, i.e. <1.013 mbar, preferably <500 mbar, particularly preferable <300 mbar, ideally <200 mbar.

The airflow generating device 30 of FIG. 2 comprises a housing 32 preferably made of plastic material. The housing 32 has an air inlet 34 and one or more air outlets 36. In this embodiment the air outlets 36 are located in side walls of the housing 32. However, they could just as well be located in a rear wall of the housing 32 opposite to the air outlet port 20 of the filter cartridge 13 to which the airflow generating device 30 is attached. Located inside the housing 32, the airflow generating device 30 comprises an electric motor 38, preferably a brushless motor, particularly preferred a brushless direct current (BLDC)-motor, and at least one fan 40 driven by the electric motor 38.

The fan 40 may be directly driven by a motor shaft 42 or a transmission (not shown) may be functionally located between the motor shaft 42 and the fan 40. The fan 40 comprises a number of essentially radially extending blades 44. The fan 40 is preferably of the radial type causing air 9 sucked in through the air inlet 34 to be discarded out of the housing 32 in a radial direction, i.e. perpendicular to a rotational axis 46 about which the fan 40 rotates. However, the fan 40 could just as well be of the axial type causing air 9 sucked in to flow through the fan 40 in an axial direction, i.e. parallel to the rotational axis 46 (see FIGS. 3 and 4).

The electric motor 38 is operated by means of electric energy from a mains power supply. The electric energy is transmitted to the motor 38 by means of a power cable 48 fixedly attached to the housing 32. Separated wires 50 of the cable 48 are connected to the electric motor 38.

The airflow generating device 30 may further comprise a printed circuit board (PCB; not shown) and/or a control unit (not shown) for controlling operation of the electric motor 38. The control unit and other electric and/or electronic components of the airflow generating device 30 could be attached to the PCB and electrically connected to conductive paths provided on the PCB. The control unit may comprise a microprocessor adapted for executing a computer program which realizes the control unit's control function when executed on the microprocessor. Other electric and/or electronic components provided inside the airflow generating device 30 may be, for example, a transformer for transforming a voltage in the range of 100 V to 240 V, 50 Hz to 60 Hz, from the mains power supply into an operation voltage of the airflow generating device 30, e.g. a direct voltage in the range of 12 V to 48 V.

Furthermore, the airflow generating device 30 could comprise a switch (not shown) for manually turning on and off the electric motor 38. Preferably, the airflow generating device 30 is provided with a receiver device 52 for receiving radio signals 54. The receiver device 52 is preferably located inside the housing 32 and attached and electrically connected to a PCB. A control unit may control operation of the electric motor 38 depending on the received radio signals 54. The radio signals 54 contain information regarding an operation of the power tool 1. To this end, the power tool 1 preferably comprises a transmitter device 56 which transmits the radio signals 54. The radio signals 54 and the format of the information contained therein preferably fulfil a Bluetooth standard, in particular a Bluetooth low-energy (BLE) standard. The transmitter device 56 is preferably located inside the housing 2 of the power tool 1.

When the power tool 1 is activated by the user, e.g. by pressing an ON-button or by activating a switch of the power tool 1, a respective radio signal 54 is automatically generated and transmitted by the transmitter device 56 of the power tool 1. The radio signal 54 is received by the receiver device 52 of the airflow generating device 30 and processed, e.g. by the control unit. As a result of the reception and/or processing of the radio signal 54, the electric motor 38 is automatically turned on and the filter arrangement starts filtering dust-laden air 7.

When the power tool 1 is turned off by the user, e.g. by pressing an OFF-button or by activating a switch of the power tool 1, a respective radio signal 54 is automatically generated and transmitted by the transmitter device 56 of the power tool 1. The radio signal 54 is received by the receiver device 52 of the airflow generating device 30 and processed, e.g. by the control unit. As a result of the reception and/or processing of the radio signal 54, the electric motor 38 is automatically turned off and the filter arrangement stops filtering dust-laden air 7. It is possible, to keep the electric motor 38 still turned on for a certain amount of time after reception and/or processing of the radio signal 54 in order to provide for some kind of post-filtering-operation after deactivating the power tool 1.

In contrast to the embodiment of the filter arrangement shown in FIG. 2, the following modifications may be made without departing from the invention:

The form of the casing 14 of the filter cartridge 13 may be any form other than cylindrical, e.g. it may have a square, rectangular or polygon (e.g. elliptical) form in a cross section perpendicular to the longitudinal extension of the casing 14. Consequently, also the form of the first and second chambers 23, 26 may have another form than shown in FIG. 2.

The form of the filter element 22 may be any form other than cylindrical, e.g. flat.

The filter cartridge 13 may have more than one filter element 22.

Figure 5:
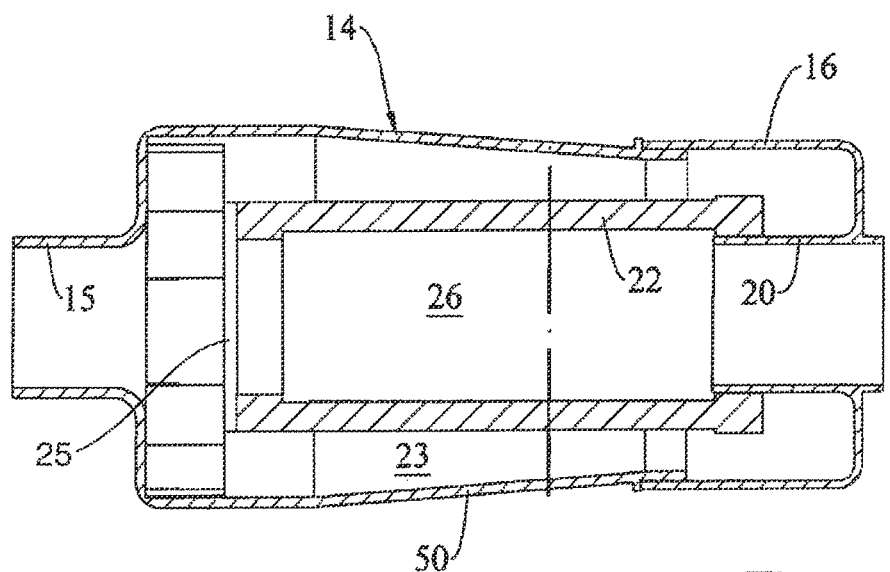
FIG. 5 a preferred embodiment of a filter cartridge of the filter arrangement of FIGS. 2 to 4.

The bladed element 100 for creating the vortex of dust-laden air 8 may be omitted (see the embodiment of FIG. 5). In FIG. 5 the first external chamber 23 is pneumatically separated from the second internal chamber 26 by wall elements comprising part of the air outlet port 20 and a separating wall 25 located opposite the air outlet port 20.

Figure 3:
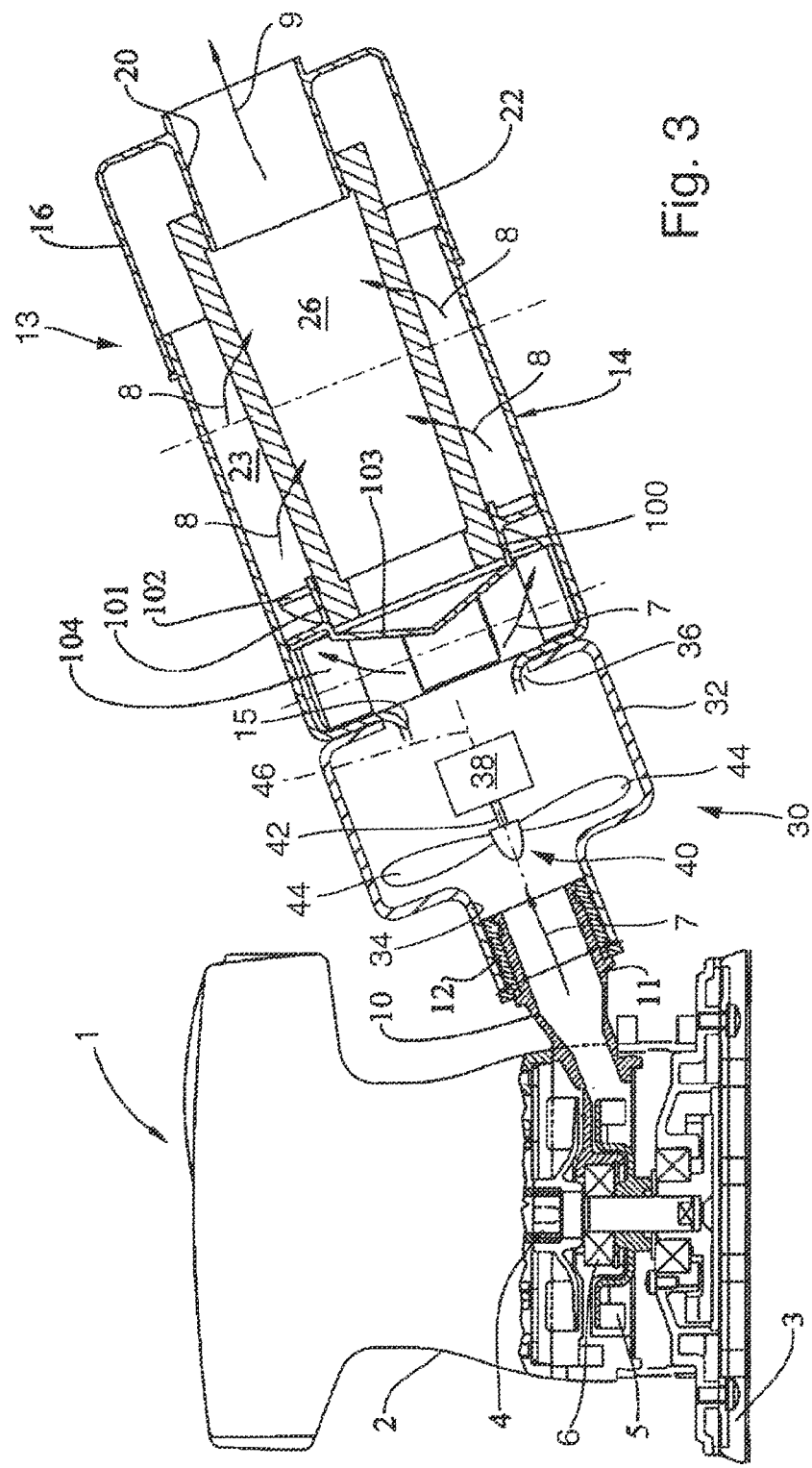
FIG. 3 a filter arrangement according to another preferred embodiment of the invention.

In an alternative embodiment of FIG. 3, the airflow generating device 30 is in pneumatic connection with the air inlet port 15 of the filter cartridge 13 in order to blow the dust-laden air 7 generated by the power tool 1 through the air inlet port 15 into the casing of the filter cartridge 13 and to create a high pressure inside the casing 14 of the filter cartridge 13. The filtered air 9 is blown through the air outlet port 20 of the filter cartridge 13, thereby generating or supporting the airflow 8 through the filter cartridge 13.

The fan 40 of the airflow generating device 30 of FIG. 3 is preferably of the axial type causing air 7 sucked in to flow through the fan 40 in an axial direction, i.e. parallel to the rotational axis 46. The air inlet 34 of the airflow generating device 30 is directly connected to the air outlet socket 11 of the power tool 1. Similarly, the air outlet 36 of the airflow generating device 30 is directly connected to the air inlet port 15 of the filter cartridge 13. Of course, it would also be possible to connected at least some of the devices 11, 30, 13 indirectly by means of suction hoses or the like.

The rotating fan 40 generates a rotating airflow 8 through the filter cartridge 13 resulting in a cyclone or vortex effect hurling larger particles contained in the dust-laden air 7 radially outwards within the filter cartridge 13. The particles hurled radially outwards are collected in the filter cartridge 13 and will not reach the filter element 22 of the filter cartridge 13. In this manner, the filter element 22 will have a longer lifetime before clogging with particles and replacement or cleaning of the filter element 13 can be performed in longer intervals. No additional peripheral blades 102 or the like are necessary within the filter cartridge 13 for generating the cyclone or vortex effect. The fan blades 44 are preferably made of a robust and hard material, e.g. of steal, possibly enameled, ceramics, a synthetic or any compound material.

Figure 4:
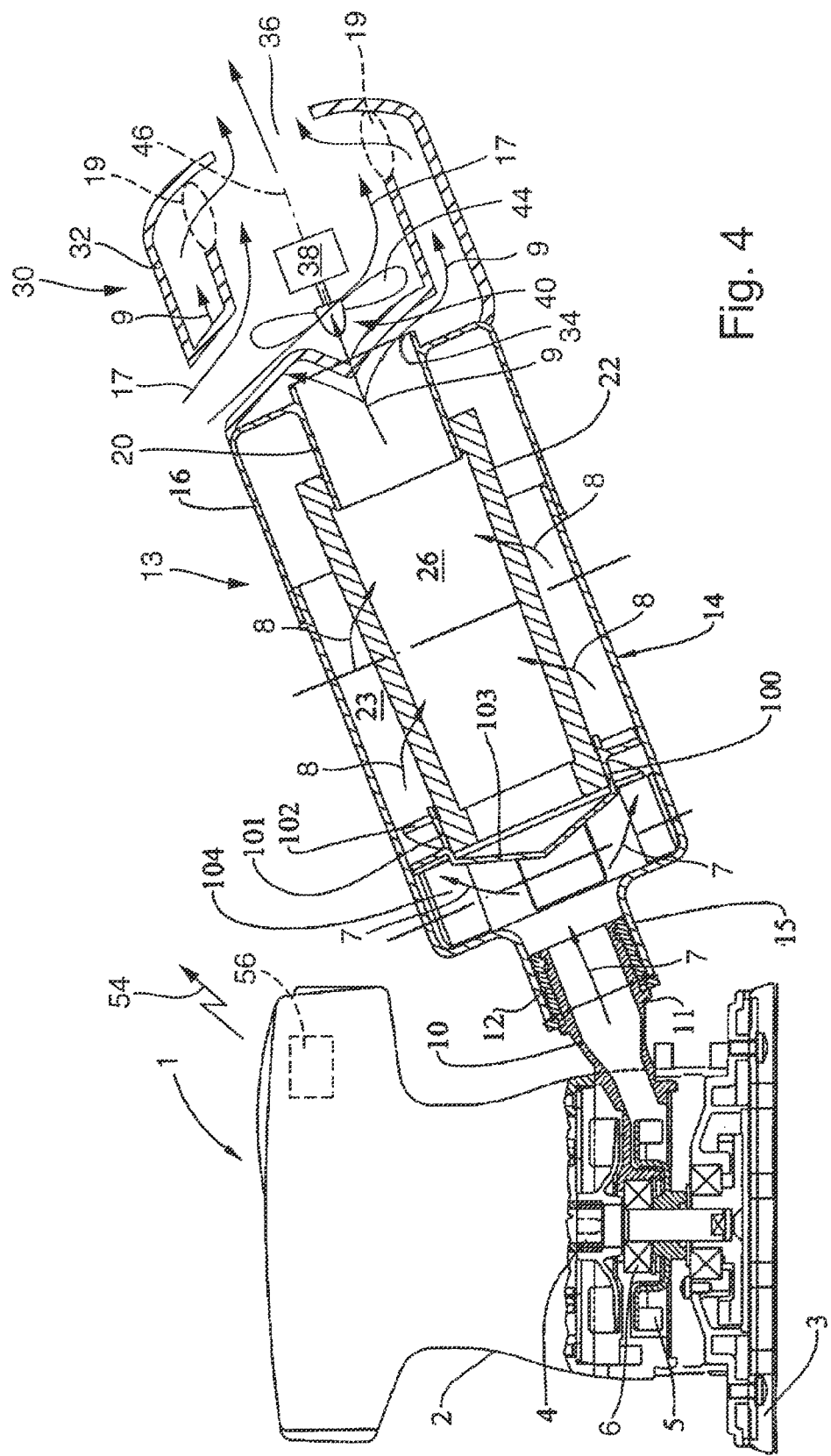
FIG. 4 a filter arrangement according to yet another preferred embodiment of the invention.

In yet another embodiment of FIG. 4, the airflow generating device 30 is in pneumatic connection with the air outlet port 20 of the filter cartridge 13 in order to suck the filtered air 9 through the air outlet port 20 of the filter cartridge 13 and to create a low pressure inside the casing 14 of the filter cartridge 13 thereby sucking the dust-laden air 7 generated by the power tool 1 through the air inlet port 15 into the casing 14 of the filter cartridge 13 and generating the airflow 8 through the filter cartridge 13. The airflow generating device 30 is designed and connected with its air inlet 34 to the air outlet port 20 of the filter cartridge 13 such that a primary air stream 17 is created by the fan 40, the primary air stream 17 flowing essentially perpendicular to the airflow 8, 9 through the filter cartridge 13 in order to generate or support the airflow 8, 9 in the manner of a jet pump. In particular, the primary air stream 17 flows essentially perpendicular to the airflow 8, 9 in a region 19 where a tube or chamber for the airflow 9 merges into a tube or chamber for the primary air stream 17. In this embodiment, the air stream 17 generated by the fan 40 is not the airflow 8, 9 through the filter cartridge 13.

Figure 6:
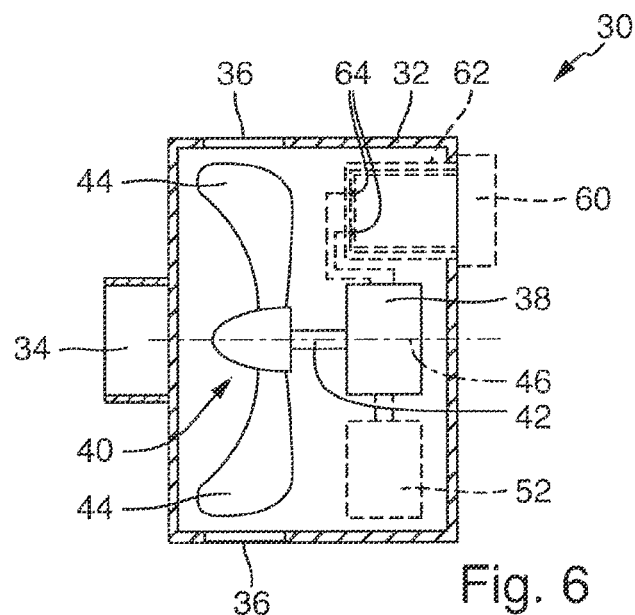
FIG. 6 an airflow generating device of the filter arrangement of FIGS. 2 and 3 according to a first embodiment.

Hereinafter, some preferred embodiments of the airflow generating device 30 are explained in further detail with reference to FIGS. 6 to 8. In the embodiment of FIG. 6 the airflow generating device 30 is operated by electric energy from a battery pack 60. To this end, the housing 32 comprises an externally accessible compartment 62, into which at least part of the battery pack 60 is inserted. The battery pack 60 is releasably attached to the housing 32 in order to avoid its unintentional separation and falling out of the compartment 62. Electronic contacts 64 are provided inside the compartment 62 for automatically effecting an electric connection to respective contacts of the battery pack 60 upon complete insertion of the battery pack 60 into the compartment 62. The battery pack 60 comprises an external casing and one or more battery cells located therein, preferably of the Lithium-Ion-type or of the Lithium-Polymer-type. The battery pack 60 provides an operating voltage in the range of 12 V to 48 V for the airflow generating device 30.

Figure 7:
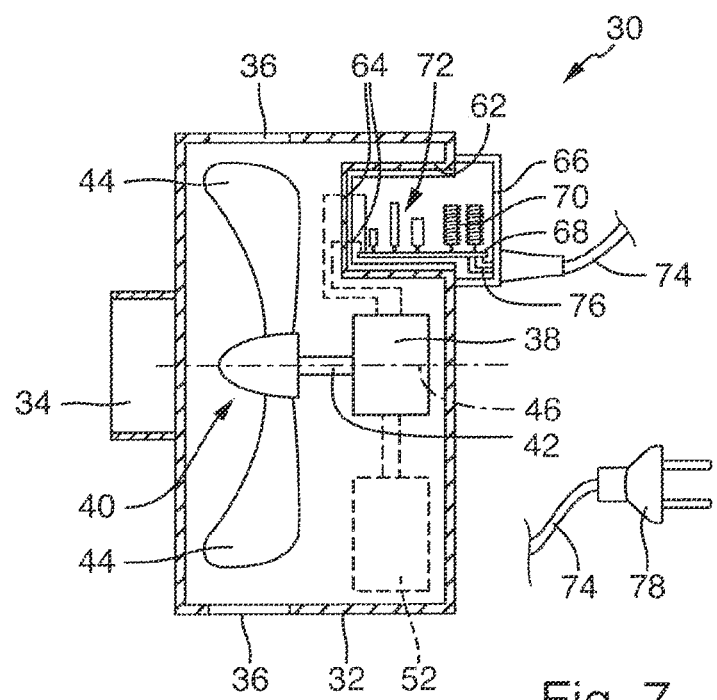
FIG. 7 an airflow generating device of the filter arrangement of FIGS. 2 and 3 according to a second embodiment.

In the embodiment of FIG. 7, the battery pack 60 has been released from the housing 32 and extracted from the compartment 62. Instead of the battery pack 60 a power supply unit 66 has been at least partially inserted into the compartment 62 and its contacts are in electric connection with the electric contacts 64 provided in the compartment 62. The power supply unit 66 is releasably attached to the housing 32 in order to avoid its unintentional separation and falling out of the compartment 62. The power supply unit 66 has an external casing essentially corresponding to the external casing of the battery pack 60. In particular, at least that part of the power supply unit 66 to be inserted into the compartment 62 corresponds to that part of the battery pack 60 to be inserted into the compartment 62. The form of that part of the power supply unit 66 not to be inserted into the compartment 62 may differ from the form of that part of the battery pack 60 not to be inserted into the compartment 62.

Preferably, the power supply unit 66 comprises a printed circuit board (PCB) 68 provided in the external casing.

Attached and electrically connected to the PCB 68 is a transformer 70 for transforming a voltage in the range of 100 V to 240 V, 50 Hz to 60 Hz, from the mains power supply into an operation voltage of the airflow generating device 30, e.g. a direct voltage in the range of 12 V to 48 V. Attached to the PCB 68 there may be further electric and/or electronic components 72 comprising, for example, a rectifier, a controller or regulator, and one or more capacitors, coils, inductances, resistors.

The electric energy of the mains power supply is transmitted to the power supply unit 66 by means of a power cable 74 fixedly attached to the external casing of the power supply unit 66. Separate wires 76 of the cable 74 are connected to the PCB 68. The power cable 74 is provided with a plug 78 at its distal end for connection to a mains power supply socket. This embodiment has the advantage that the airflow generating device 30 can be operated for an almost infinite amount of time. During operation of the airflow generating device 30 with the power supply unit 66 the battery pack 60 may be recharged in an external charging station (not shown).

In the embodiment of FIG. 8, the battery pack 60 has been released from the housing 32 and extracted from the compartment 62. Instead of the battery pack 60 an adapter unit 80 has been at least partially inserted into the compartment 62 and its contacts are in electric connection with the electric contacts 64 provided in the compartment 62. The adapter unit 80 is releasably attached to the housing 32 in order to avoid its unintentional separation and falling out of the compartment 62. The adapter unit 80 has an external casing essentially corresponding to the external casing of the battery pack 60. In particular, at least that part of the adapter unit 80 to be inserted into the compartment 62 corresponds to that part of the battery pack 60 to be inserted into the compartment 62. The form of that part of the adapter unit 80 not to be inserted into the compartment 62 may differ from the form of that part of the battery pack 60 not to be inserted into the compartment 62.

The adapter unit 80 is provided with a first cable 82 connected to an external power supply unit 84. The external power supply unit 84 is provided with a second cable 86 and a power plug 88 at its distal end for connection of the external power supply unit 84 to a power socket (not shown) of a mains power supply. Preferably, the adapter unit 80 merely serves as an interface between the power supply unit 84 and the contacts 64 of the compartment 62. To this end, separate wires 83 of the first cable 82 are connected to the contacts of the adapter unit 80 adapted for entering into contact with the contacts 64 of the compartment 62 upon complete insertion of the adapter unit 80 into the compartment 62.

Preferably, the power supply unit 84 has an external casing and comprises a printed circuit board (PCB) 90 provided in the external casing. Attached and electrically connected to the PCB 90 is a transformer 92 for transforming a voltage in the range of 100 V to 240 V, 50 Hz to 60 Hz, from the mains power supply into an operation voltage of the airflow generating device 30, e.g. a direct voltage in the range of 12 V to 48 V. Attached to the PCB 90 there may be further electric and/or electronic components 94 comprising, for example, a rectifier, a controller or regulator, and one or more capacitors, coils, inductances, resistors. Separate wires 96 of the second cable 86 are connected to the PCB 90. These wires 96 convey the electric energy from the mains power supply to the transformer 92 and preferably comprise three wires 96, one for the phase conductor (with black or brown isolation), one for the neutral conductor (with blue or grey isolation) and one for the protective conductor (with green/yellow isolation). Further, separate wires 98 of the first cable 82 are connected to the PCB 90. These wires 98 convey the electric energy for the operation of the airflow generating device 30, which was previously transformed by the transformer 92. They preferably comprise two wires 98, one for the positive voltage (with red isolation) and one for the negative voltage (with black isolation).

Besides the various ways of realization of the airflow generating device 30, there are various further possibilities how the filter arrangement according to the present invention may be realized. Schematic views of possible realizations are shown in FIGS. 9 to 12.

Figure 9:
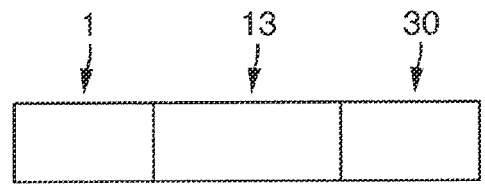
FIG. 9 the filter arrangement of FIG. 2 in a schematic view.

The embodiment shown in FIG. 9 essentially corresponds to the embodiment of FIG. 2. The filter cartridge 13 is directly attached with its air inlet port 15 to the air outlet socket 11 of the power tool 1. The filter cartridge 13 is releasably connected to the power tool 1. The direct connection between the air outlet socket 11 of the power tool 1 on the one hand and the air inlet port 15 of the filter cartridge 13 on the other hand is realized by means of frictional force, a bayonet joint and/or a snap connection. Alternatively, the direct connection could also be embodied my means of magnetic force. Further, the airflow generating device 30 is directly attached to the air outlet port 20 of the filter cartridge 13. In the case of a releasable connection between the filter cartridge 13 and the airflow generating device 30, the direct connection between the air outlet port 20 of the filter cartridge 13 and the airflow generating device 30 is realized by means of frictional force, a bayonet joint and/or a snap connection. The releasable direct connection could also be embodied my means of magnetic force. Alternatively, the airflow generating device 30 could also form an integral part of a part of the casing 14 of the filter cartridge 13 comprising the air outlet port 20. In particular, the airflow generating device 30 could form an integral part of the lid 16. The lid 16 may be releasably attached to the rest of the casing 14 by means of frictional force, a bayonet joint and/or a snap connection. The releasable attachment could also be embodied my means of magnetic force.

Figure 10:
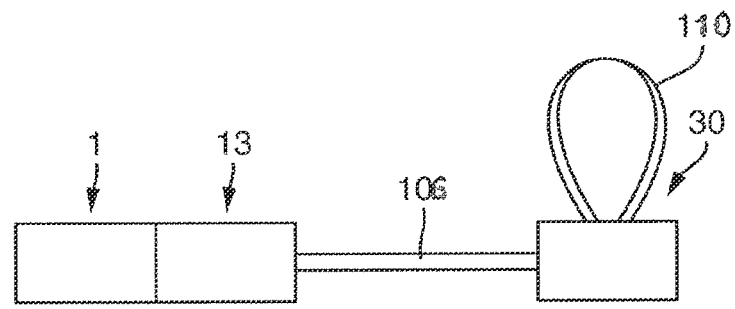
FIG. 10 a filter arrangement according to another embodiment of the invention in a schematic view.

FIG. 10 shows another embodiment of the filter arrangement. In contrast to the embodiment of FIG. 7, the airflow generating device 30 is indirectly attached to the air outlet port 20 of the filter cartridge 13 by means of a second suction hose 106. One end of the hose 106 is connected to the air outlet port 20 of the filter cartridge 13 and the other end of the hose 106 is connected to an air inlet 34 (see FIGS. 2 and 6 to 8) of the airflow generating device 30. The suction hose 106 is preferably releasably connected to the filter cartridge 13 and the airflow generating device 30. The releasable connection between the suction hose 106 and the filter cartridge 13 on the one hand and/or the suction hose 106 and the airflow generating device 30 on the other hand may be realized by means of frictional force, a bayonet joint or a snap connection. The releasable connection could also be embodied my means of magnetic force. In this embodiment, the airflow generating device 30 may be attached to a belt 110 looped around the waist of the user or draped over a shoulder of the user (see FIGS. 10 to 12). The power tool 1 and the filter cartridge 13 are rigidly connected to each other and constitute a single unit which can be easily handled. Hence, this embodiment provides for a maximum amount of freedom of movement for the user during use of the power tool 1 without having to carry the additional weight of the airflow generating device 30 at the power tool 1 during its use.

Figure 11:
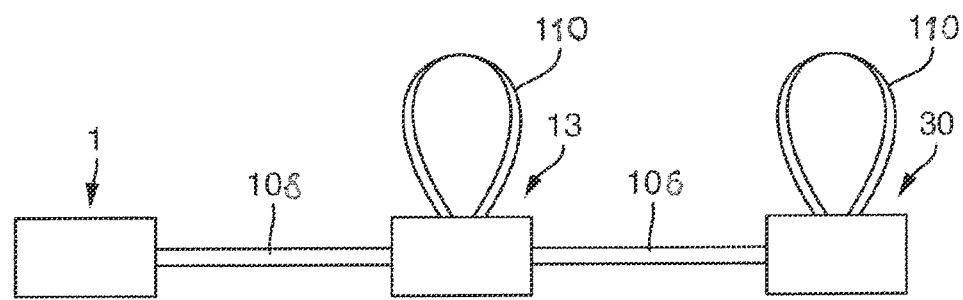
FIG. 11 a filter arrangement according to yet another embodiment of the invention in a schematic view.

FIG. 11 shows yet another embodiment of the filter arrangement. In contrast to the embodiment of FIG. 10, the filter cartridge 13 is indirectly attached to the air outlet socket 11 of the power tool 1 by means of a first suction hose 108. One end of the hose 108 is connected to the air outlet socket 11 of the power tool 1 and the other end of the hose 108 is connected to the air inlet port 15 of the filter cartridge 13. The suction hose 108 is preferably releasably connected to the power tool 1 and the filter cartridge 13. The releasable connection between the suction hose 108 and the power tool 1 on the one hand and/or between the suction hose 108 and the filter cartridge 13 on the other hand may be realized by means of frictional force, a bayonet joint or a snap connection. The releasable connection could also be embodied my means of magnetic force. In this embodiment, the filter cartridge 13 and/or the airflow generating device 30 may be attached to a belt 110 looped around the waist of the user or draped over a shoulder of the user. Hence, this embodiment provides for a maximum amount of freedom of movement for the user during use of the power tool 1 without having to carry the additional weight of the filter cartridge 13 and the airflow generating device 30 at the power tool 1 during its use.

Figure 12:
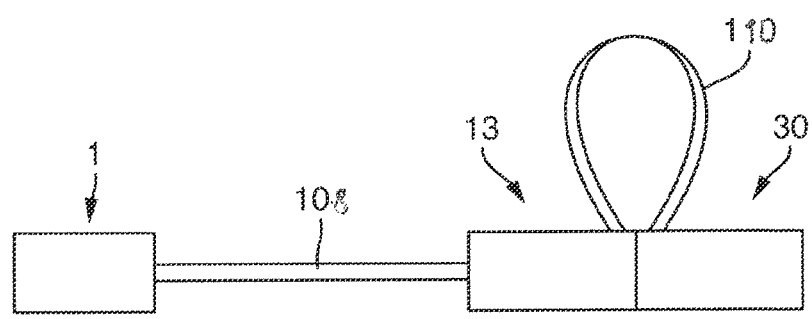
FIG. 12 a filter arrangement according to yet another embodiment of the invention in a schematic view.

Finally, FIG. 12 shows yet another embodiment of the present invention. In contrast to the embodiment of FIG. 11, the airflow generating device 30 is directly attached to the filter cartridge 13, similar the embodiments of FIGS. 2 and 9. The airflow generating device 30 may be releasably attached to the filter cartridge 13 or it may form an integral part of at least part of the casing 14 of the filter cartridge 13, e.g. of the lid 16. In this embodiment, the filter cartridge 13 and the airflow generating device 30 are rigidly connected to each other and constitute a single unit which can be easily handled. In particular, the unit may be attached to a belt 110 looped around the waist of the user or draped over a shoulder of the user. Hence, this embodiment provides for a maximum amount of freedom of movement for the user during use of the power tool 1 without having to carry the additional weight of the filter cartridge 13 and the airflow generating device 30 at the power tool 1 during its use.

The invention claimed is:

1. Filter arrangement for filtering dust-laden air (7) generated by a hand-guided power tool (1) having a motor, during operation of said hand-guided power tool (1), said filter arrangement comprising a filter cartridge (13) having
    a hollow casing (14) having a longitudinal extension along a longitudinal axis,
    a hollow filter element (22) located inside said hollow casing (14), having a corresponding longitudinal extension along said longitudinal axis,
    an air inlet port (15) provided in said hollow casing (14), said air inlet port (15) located upstream with respect to an airflow (8) through said filter cartridge (13) and with respect to said hollow filter element (22), said air inlet port (15) adapted to be pneumatically connected to said hand-guided power tool (1) in order to allow said dust-laden air (7) generated by said hand-guided power tool (1) to flow into said hollow casing (14), and
    an air outlet port (20) provided in said hollow casing (14), said air outlet port (20) located downstream with respect to the airflow (8) through said filter cartridge (13) and with respect to said hollow filter element (22), said air outlet port (20) adapted to allow filtered air (9) to leave said filter cartridge (13),
    wherein an external chamber (23) of said filter cartridge (13) is formed between said hollow casing (14) and said hollow filter element (22),
    an internal chamber (26) of said filter cartridge (13) is formed inside said hollow filter element (22),
    said internal chamber (26) is closed by means of a conical head portion (103) at a first end of said internal chamber (26) facing towards said air inlet port (15),
    said external chamber (23) is in pneumatic connection with said air inlet port (15) and said internal chamber (26) at a second end opposite to said first end is in pneumatic connection with said air outlet port (20),
    wherein said filter arrangement comprises an active airflow generating device (30) with a fan (40) comprising a plurality of blades (44) and driven by an electric fan motor (38) separate from said motor of said hand-guided power tool (1), an air inlet (34) of said active airflow generating device (30) being in pneumatic connection with said air outlet port (20) and said internal chamber (26) of said filter cartridge (13) in order to generate or support said airflow (8) through said filter cartridge (13); and
    wherein said active airflow generating device (30) is indirectly pneumatically connected to said air outlet port (20) of said filter cartridge (13) by a second suction hose (106) in order to make said filtered air (9) from said filter cartridge (13) flow through said second suction hose (106) into said active airflow generating device (30).

2. Filter arrangement according to claim 1, wherein said active airflow generating device (30) is configured to suck said filtered air (9) through the air outlet port (20) of said filter cartridge (13) and to create a pressure lower than the ambient pressure inside said hollow casing (14) of said filter cartridge (13) thereby sucking said dust-laden air (7) generated by said hand-guided power tool (1) through said air inlet port (15) into said hollow casing (14) of said filter cartridge (13) and generating or supporting said airflow (8) through said filter cartridge (13).

3. Filter arrangement according to claim 1, wherein said air inlet port (15) of said filter cartridge (13) is directly pneumatically connected to said hand-guided power tool (1) in order to allow said dust-laden air (7) generated by said hand-guided power tool (1) to flow directly into said hollow casing (14) of said filter cartridge (13).

4. Filter arrangement according to claim 1, wherein said air inlet port (15) of said filter cartridge (13) is indirectly pneumatically connected to said hand-guided power tool (1) by a first suction hose (108) in order to make said dust-laden air (7) generated by said hand-guided power tool (1) flow through said first suction hose (108) into said hollow casing (14) of said filter cartridge (13).

5. Filter arrangement according to claim 1, wherein said active airflow generating device (30) is directly pneumatically connected to said air outlet port (20) of said filter cartridge (13) in order to allow said filtered air (9) from said filter cartridge (13) to flow directly into said active airflow generating device (30).

6. Filter arrangement according to claim 1, wherein said active airflow generating device (30) is a portable device adapted to be carried by a user of said filter arrangement.

7. Filter arrangement according to claim 1, wherein said active airflow generating device (30) comprises a housing (32) having said electric fan motor (38) and said fan (40) arranged therein, having said air inlet (34) located upstream with respect to said fan (40) and with respect to an air stream flowing through said active airflow generating device (30) upon its activation, and also having an air outlet (36) located downstream with respect to said fan (40) and with respect to said air stream flowing through said active airflow generating device (30).

8. Filter arrangement according to claim 1, wherein said active airflow generating device (30) comprises a housing (32) having said electric fan motor (38) arranged therein, and also having a battery pack (60) arranged at least partly therein for operating said electric fan motor (38) independently from a mains power supply.

9. Filter arrangement according to claim 8, wherein said housing (32) of said active airflow generating device (30) comprises an externally accessible compartment (62) for receiving at least part of said battery pack (60), and wherein said battery pack (60) is extractable from said externally accessible compartment (62).

10. Filter arrangement according to claim 1, wherein said active airflow generating device (30) comprises a power supply unit (66) with a cable (74) and a power plug (78) for attachment to a power socket of a mains power supply, and also comprises an externally accessible compartment (62) for receiving at least part of said power supply unit (66) for operating said electric fan motor (38) with electric energy from said mains power supply.

11. Filter arrangement according to claim 1, wherein said active airflow generating device (30) comprises an adapter unit (80) with a first cable (82) connected to an external power supply unit (84) with a second cable (86) and a power plug (88) for attachment of said external power supply unit (84) to a power socket of a mains power supply, and also comprises an externally accessible compartment (62) for receiving at least part of said adapter unit (80) for operating said electric fan motor (38) with electric energy from said mains power supply.

12. Filter arrangement according to claim 1, wherein said active airflow generating device (30) comprises a receiver device (52) for receiving radio signals (54) containing information relating to operation of said hand-guided power tool (1), and wherein the active airflow generating device (30) is automatically activated or deactivated depending on a content of the received radio signals (54).

13. Power tool arrangement comprising the hand-guided power tool (1), and the filter arrangement for filtering dust-laden air (7) generated by said hand-guided power tool (1) during its operation, wherein said filter arrangement is configured according to claim 1.

14. Power tool arrangement according to claim 13, wherein said hand-guided power tool (1) comprises a transmitter device (56) for transmitting radio signals (54) containing information relating to operation of said hand-guided power tool (1), including where the radio signals (54) turn on and/or off said hand-guided power tool (1).

15. Filter arrangement according to claim 3, wherein said active airflow generating device (30) is directly pneumatically connected to said air outlet port (20) of said filter cartridge (13) in order to allow said filtered air (9) from said filter cartridge (13) to flow directly into said airflow generating device (30).

16. Filter arrangement according to claim 1, wherein the hollow casing (14) has a substantially cylindrical form with a longitudinal extension along a longitudinal axis.

17. Filter arrangement according to claim 16, wherein the filter element (22) has a substantially cylindrical form with a smaller diameter than the hollow casing (14) and with a longitudinal extension along a longitudinal axis.

18. Filter arrangement according to claim 17, wherein the hollow casing (14) and the filter element (22) share the same longitudinal axis.

19. Filter arrangement for filtering dust-laden air (7) generated by a hand-guided power tool (1) having a motor, during operation of said hand-guided power tool (1), said filter arrangement comprising a filter cartridge (13) having
  a hollow casing (14) having a longitudinal extension along a longitudinal axis,
  a hollow filter element (22) located inside said hollow casing (14), having a corresponding longitudinal extension along said longitudinal axis,
  an air inlet port (15) provided in said hollow casing (14), said air inlet port (15) located upstream with respect to an airflow (8) through said filter cartridge (13) and with respect to said hollow filter element (22), said air inlet port (15) adapted to be pneumatically connected to said hand-guided power tool (1) in order to allow said dust-laden air (7) generated by said hand-guided power tool (1) to flow into said hollow casing (14), and
  an air outlet port (20) provided in said hollow casing (14), said air outlet port (20) located downstream with respect to the airflow (8) through said filter cartridge (13) and with respect to said hollow filter element (22), said air outlet port (20) adapted to allow filtered air (9) to leave said filter cartridge (13),
  wherein an external chamber (23) of said filter cartridge (13) is formed between said hollow casing (14) and said hollow filter element (22),
  an internal chamber (26) of said filter cartridge (13) is formed inside said hollow filter element (22),
  said internal chamber (26) is closed by means of a conical head portion (103) at a first end of said internal chamber (26) facing towards said air inlet port (15),
  said external chamber (23) is in pneumatic connection with said air inlet port (15) and said internal chamber (26) at a second end opposite to said first end is in pneumatic connection with said air outlet port (20),
  wherein said filter arrangement comprises an active airflow generating device (30) with a fan (40) comprising a plurality of blades (44) and driven by an electric fan motor (38) separate from said motor of said hand-guided power tool (1), an air inlet (34) of said active airflow generating device (30) being in pneumatic connection with said air outlet port (20) and said internal chamber (26) of said filter cartridge (13) in order to generate or support said airflow (8) through said filter cartridge (13);
  wherein said active airflow generating device (30) comprises a housing (32) having said electric fan motor (38) and said fan (40) arranged therein, having said air inlet (34) located upstream with respect to said fan (40) and with respect to an air stream flowing through said active airflow generating device (30) upon its activation, and also having an air outlet (36) located downstream with respect to said fan (40) and with respect to said air stream flowing through said active airflow generating device (30); and
  wherein said air stream is a primary air stream (17) flowing perpendicular to said airflow (8) through said filter cartridge (13) in order to generate or support said airflow (8) in the manner of a jet pump.

20. Filter arrangement for filtering dust-laden air (7) generated by a hand-guided power tool (1) having a motor, during operation of said hand-guided power tool (1), said filter arrangement comprising a filter cartridge (13) having
  a hollow casing (14) having a longitudinal extension along a longitudinal axis, a hollow filter element (22) located inside said hollow casing (14), having a corresponding longitudinal extension along said longitudinal axis, an air inlet port (15) provided in said hollow casing (14), said air inlet port (15) located upstream with respect to an airflow (8) through said filter cartridge (13) and with respect to said hollow filter element (22), said air inlet port (15) adapted to be pneumatically connected to said hand-guided power tool (1) in order to allow said dust-laden air (7) generated by said hand-guided power tool (1) to flow into said hollow casing (14), and an air outlet port (20) provided in said hollow casing (14), said air outlet port (20) located downstream with respect to the airflow (8) through said filter cartridge (13) and with respect to said hollow filter element (22), said air outlet port (20) adapted to allow filtered air (9) to leave said filter cartridge (13), wherein an external chamber (23) of said filter cartridge (13) is formed between said hollow casing (14) and said hollow filter element (22), an internal chamber (26) of said filter cartridge (13) is formed inside said hollow filter element (22), said internal chamber (26) is closed by means of a conical head portion (103) at a first end of said internal chamber (26) facing towards said air inlet port (15), said external chamber (23) is in pneumatic connection with said air inlet port (15) and said internal chamber (26) at a second end opposite to said first end is in pneumatic connection with said air outlet port (20), wherein said filter arrangement comprises an active airflow generating device (30) with a fan (40) comprising a plurality of blades (44) and driven by an electric fan motor (38) separate from said motor of said hand-guided power tool (1), an air inlet (34) of said active airflow generating device (30) being in pneumatic connection with said air outlet port (20) and said internal chamber (26) of said filter cartridge (13) in order to generate or support said airflow (8) through said filter cartridge (13); and wherein said hollow casing (14) of said filter cartridge (13) comprises a lid (16) detachable from the rest of said hollow casing (14) and comprising said air outlet port (20), wherein the active airflow generating device (30) forms an integral part of the lid (16).

21. Filter arrangement for filtering dust-laden air (7) generated by a hand-guided power tool (1) having a motor, during operation of said hand-guided power tool (1), said filter arrangement comprising a filter cartridge (13) having a hollow casing (14) having a longitudinal extension along a longitudinal axis, a hollow filter element (22) located inside said hollow casing (14), having a corresponding longitudinal extension along said longitudinal axis, an air inlet port (15) provided in said hollow casing (14), said air inlet port (15) located upstream with respect to an airflow (8) through said filter cartridge (13) and with respect to said hollow filter element (22), said air inlet port (15) adapted to be pneumatically connected to said hand-guided power tool (1) in order to allow said dust-laden air (7) generated by said hand-guided power tool (1) to flow into said hollow casing (14), and an air outlet port (20) provided in said hollow casing (14), said air outlet port (20) located downstream with respect to the airflow (8) through said filter cartridge (13) and with respect to said hollow filter element (22), said air outlet port (20) adapted to allow filtered air (9) to leave said filter cartridge (13), wherein an external chamber (23) of said filter cartridge (13) is formed between said hollow casing (14) and said hollow filter element (22), an internal chamber (26) of said filter cartridge (13) is formed inside said hollow filter element (22), said internal chamber (26) is closed by means of a conical head portion (103) at a first end of said internal chamber (26) facing towards said air inlet port (15), said external chamber (23) is in pneumatic connection with said air inlet port (15) and said internal chamber (26) at a second end opposite to said first end is in pneumatic connection with said air outlet port (20), wherein said filter arrangement comprises an active airflow generating device (30) with a fan (40) comprising a plurality of blades (44) and driven by an electric fan motor (38) separate from said motor of said hand-guided power tool (1), an air inlet (34) of said active airflow generating device (30) being in pneumatic connection with said air outlet port (20) and said internal chamber (26) of said filter cartridge (13) in order to generate or support said airflow (8) through said filter cartridge (13);

wherein said air inlet port (15) of said filter cartridge (13) is directly pneumatically connected to said hand-guided power tool (1) in order to allow said dust-laden air (7) generated by said hand-guided power tool (1) to flow directly into said hollow casing (14) of said filter cartridge (13); and wherein said active airflow generating device (30) is indirectly pneumatically connected to said air outlet port (20) of said filter cartridge (13) by a second suction hose (106) in order to make said filtered air (9) from said filter cartridge (13) flow through said second suction hose (106) into said active airflow generating device (30).

* * * * *